April 29, 1924.
L. K. SCHWALL
COFFEE URN
Filed Dec. 31, 1923
1,491,825
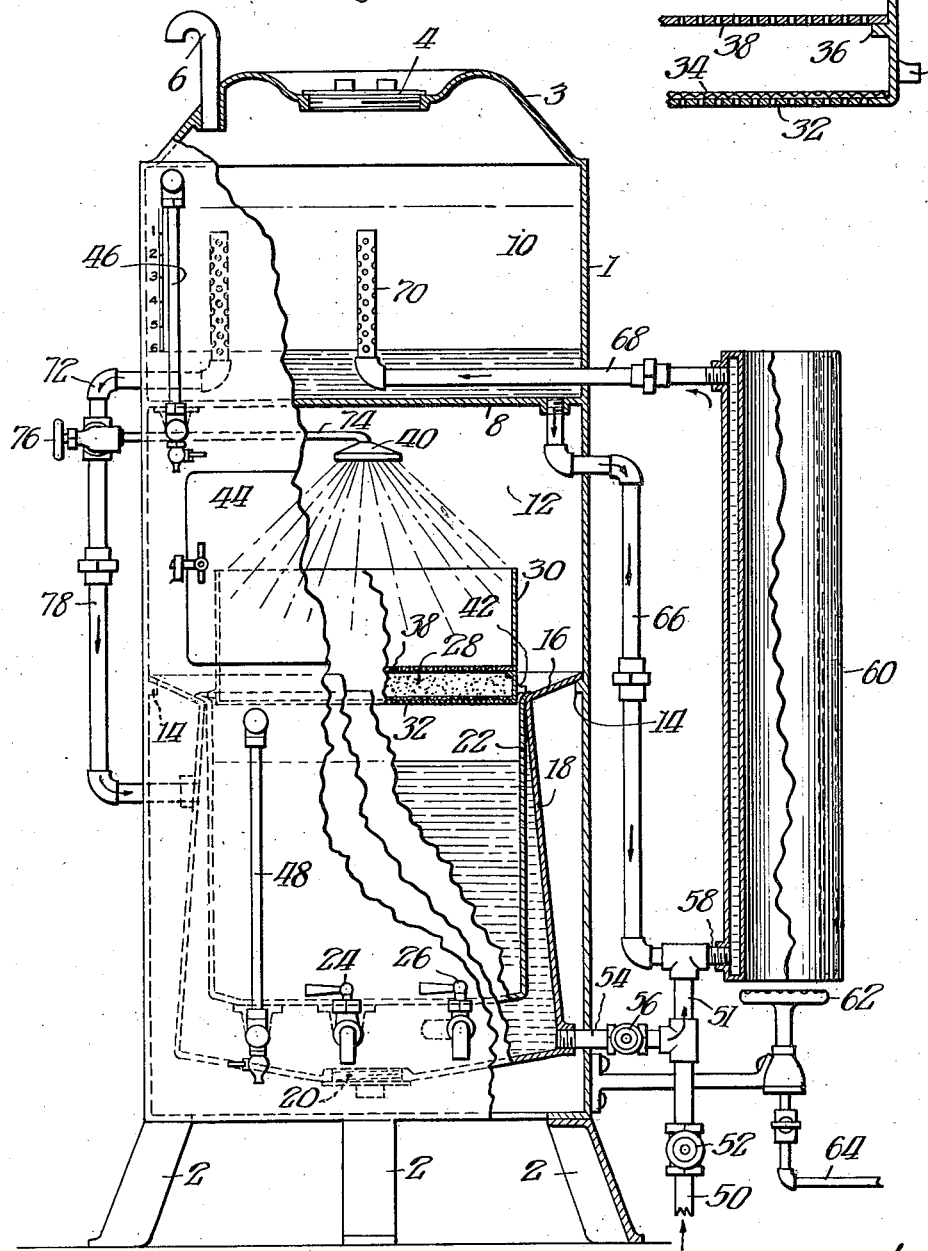
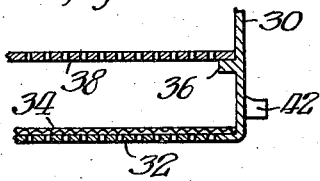
Inventor:
Louis K. Schwall,
By Cheever & Cox
Attys Patented Apr. 29, 1924.

1,491,825

UNITED STATES PATENT OFFICE.

LOUIS K. SCHWALL, OF CHICAGO, ILLINOIS.

COFFEE URN.

Application filed December 31, 1923. Serial No. 683,622.

*To all whom it may concern:*

Be it known that I, LOUIS K. SCHWALL, a citizen of the United States, residing at Chicago, in the county of Cook and State of Illinois, have invented a certain new and useful Improvement in Coffee Urns, of which the following is a specification.

My invention relates to coffee urns, particularly in the larger sizes used for hotel and restaurant work. One of the objects of the invention is to provide apparatus so constructed that it will avoid the need of pouring hot water in through the top of the urn. In many of the coffee urns now in use it is necessary for an attendant to climb upon a ladder or stool and raise a bucket of hot water over his head in order to operate the device, which is both inconvenient and dangerous. It is my purpose to provide a construction into which the heated water may be introduced with proper distribution by merely manipulating one or more valves. Another object of the invention is to provide apparatus in which the water may be heating for a fresh batch of coffee at the same time that the made coffee is being dispensed to customers. Another object is to provide means within the urn itself for measuring the quantity of hot water to be allotted to the charge of ground coffee. Still another object is to provide an urn so constructed that the spent coffee grounds may be removed and a fresh supply of ground coffee introduced from the side of the apparatus instead of through the top thereof as has been the common practice heretofore. In addition to convenience this makes it possible to remove the spent coffee grounds and introduce a fresh supply while the water is being heated for a fresh batch. Still another object is to provide a source of hot water from which tea may be made and at the same time utilize this source for maintaining the liquid coffee at or near the boiling temperature. In this connection it is my purpose to provide a water heater and a circulatory system by which the last mentioned source of hot water and in fact all of the liquid in the apparatus may be kept at or near the boiling temperature.

A further object is to provide a heater which is intimately connected with but is disconnectible as a unit from the main body of the urn so that if as a result of careless operation the heater should go dry and burn out, a new heater can be substituted without disarranging the assembly of the chief parts of the urn.

I accomplish my objects by the mechanism illustrated in the accompanying drawings, in which—

Figure 1 is a front elevation of the complete apparatus, portions being broken away to reveal the internal construction.

Figure 2 is a fragmentary detail showing in vertical section the construction of the coffee grounds container.

Like numerals denote like parts throughout the several views.

According to the design illustrated there is a main body or casing 1 which is mounted on legs 2 and at the top has a dome 3 closed at the center by a screw cap 4. Issuing from the dome is a blowoff or safety valve 6. A little less than one-third of the way down from the top of the casing is a floor 8 or diaphragm which extends completely across the casing and thus produces a water compartment or chamber 10. Below this floor is a spray compartment or chamber 12 which occupies a little less than another third of the height.

At the bottom of the spray chamber, lugs 14 are secured to the inner wall of the casing and these support an annular flange 16 formed at the upper end of a water jacket 18. This water jacket extends nearly to the bottom of the casing where it has a drain plug 20. Within the water jacket is a reservoir 22 for holding the liquid coffee. A spigot 24 leads out through the side of the casing from the coffee receptacle and a spigot 26 leads out from the water jacket. The coffee receptacle is soldered or otherwise fastened at its upper end to the upper end of the water jacket.

The coffee grounds 28 are contained in a receptacle 30 which is cylindrical and open at the top. It is perforated at the bottom 32, this perforated bottom forming a support for a cheese cloth strainer 34 as shown in detail in Figure 2. Lugs 36 project from the inner wall of receptacle 30 a few inches from the bottom and these support a perforated plate 38. This holds the coffee evenly distributed and prevents it from collecting to a greater depth in one part of the receptacle than another. It also serves as a baffle or distributor for the water which issues from the spray nozzle 40.

Lugs 42 extend from the sides of the coffee grounds receptacle 30 and serve to support it upon the throat of the reservoir 22 which holds the liquid coffee. By preference the outer diameter of receptacle 30 is slightly less than the inner diameter of the throat of the coffee reservoir, the purpose being to prevent water from collecting in the space surrounding the grounds receptacle 30. If water reaches this space it will drain down into the coffee reservoir.

The middle compartment or spray chamber 12 has a hinged door 44 in front. This is of sufficient dimensions to permit the coffee grounds receptacle to be lifted bodily out of the apparatus.

The apparatus is equipped with suitable liquid gauges. One of these marked 46 is located at the upper compartment or heating chamber 10 and is so connected that it will indicate the quantity of water therein. Another gauge 48 is so connected as to indicate the height of the liquid coffee within the reservoir 22.

I will now describe the heating and circulating system: A pipe 50 is connected with the city water supply and is provided with a valve 52. It has a branch 54 which connects with the bottom of the water jacket 18. This branch is equipped with a valve 56. Above the branch 54 there is a connection 58 which leads to the bottom of a water heater 60. This heater is here shown in the form of a hollow cylindrical water receptacle the heat for which is applied from a gas burner 62. Gas from this burner is led in through the pipe 64. A branch 66 leads from pipe 50 to the bottom of the heating chamber 10 and a pipe 68 leads from the upper end of the heater 60 to the center of chamber 10 where it connects with the lower end of an upstanding distributor pipe 70. A pipe 72 leads from the lower portion of the heating chamber 10 to a branch 74 which supplies water for the spray 40 previously mentioned. The flow into this spray branch is controlled by a hand valve 76. Pipe 72 connects with a pipe 78 which leads through the side of the casing to the inside of the water jacket 18. Thus the hot water in the heating chamber 10 may flow either to the water jacket 18 or spray 40.

The spray is so placed and designed that the water issuing from it will be distributed thoroughly over the coffee grounds in the receptacle 30, thus causing all parts of the grounds to be subjected to the leaching action of the water from the nozzle 40.

Operation: Let it be assumed that the apparatus is entirely empty. The operator will close the valves 76 and open the valves 52 and 56. The consequence is that cold water from the source of supply will flow into the system, filling the water jacket 18, the heater 60 and the heating chamber 10. When the water has reached the desired level in the chamber 10 the attendant will close the valve 52. For the sake of illustration let it be assumed that the operator permits the water to flow until the chamber 10 contains 8 gals. The burner 62 is now lighted and commences to heat the water. There are now two complete circulatory systems in operation. One system or circuit may be traced as follows: from the top of the heater 60 through pipes 68 and 70 to chamber 10, thence down through the pipe 66 and 58 to the bottom of the heater. The other circuit may be traced as follows: from the heater 60 to the chamber 10, thence down through pipe 72, 78 to the water jacket 18, thence through pipes 54 and 51 back to the bottom of the heater. It will be observed that the apparatus has two water circuits arranged in parallel, the heater being common to both, and the return duct being in one case the pipe 66 and in the other the pipe 78.

The water is permitted to heat and circulate in the manner described until it reaches the boiling temperature whereupon the apparatus is ready for making coffee. At this or a previous time a supply of ground coffee 28 is placed in the bottom of the receptacle 30. The operator now opens the spray valve 76 which permits the boiling water to flow out through the nozzle 40 and to be sprayed upon the coffee grounds. The water is caused to flow gradually so as to extract the flavor of the coffee thoroughly and this is continued preferably until six of the eight gallons of water have flowed down through the coffee and collected in the coffee reservoir 22. The water is distributed so thoroughly from the nozzle 40 that when the 6 gals. have passed through the coffee the essence has been extracted from it. The liquid coffee is now within the reservoir 22 from which it may be drawn off as required through the spigot 24.

There are at this time 2 gals. of water remaining in the heating chamber 10 and this will be enough to cover the mouth of the pipe 68. Hence the two heating circuits are maintained, and the result is that the water in the heating jacket 18 is kept at or near boiling temperature. This serves a double purpose—first, to keep the coffee in the reservoir 22 hot, and second, to form a source from which hot water may be drawn for making tea or cocoa.

In order to save time, especially in a busy restaurant, it is possible in my apparatus to heat a fresh batch of water at the same time that the liquid coffee is being drawn from the reservoir. For this purpose the attendant closes valve 56 and opens the valve 52, the spray valve 76 having been previously closed. This causes the heating chamber 10 to be again filled to the maximum level, that is, 8 gallons, for example. The result is that by the time the coffee reservoir 22 is emptied a fresh supply of hot water will be on hand.

During this time the door 44 may be opened and the grounds receptacle 30 taken out, recharged and replaced. It will be observed that while the liquid coffee is being withdrawn from the reservoir 22 the steam arising from it will soften the fresh charge of coffee grounds, thus preparing the latter to be more quickly and thoroughly acted upon when the spray valve 76 is again opened and hot water issues from the nozzle 40.

From the foregoing it will be seen that my apparatus may be quickly filled with water in the first instance, and that as soon as it is filled the water in it may be heated quickly and maintained at a high temperature in all parts. The liquid coffee in the coffee reservoir may be kept hot as long as desired and a supply of hot water for tea making it always on hand.

Another important characteristic is that while one batch of liquid coffee is being drawn off another batch of water may be heating, thus not only saving time for bringing the fresh batch of water up to boiling temperature but making it possible in view of other characteristics of my apparatus to utilize the interim for removing the spent coffee grounds and introducing a fresh charge. It will be noted that each batch of coffee is kept individual and there is no tendency for the operator to leave part of the old grounds in to be subjected a second time to the action of hot water. In other words, when the operator has removed the coffee receptacle it is just as easy for him to remove the entire contents as it is to leave some of the old coffee in place. Hence the coffee is always made from fresh coffee grounds and there is no mixing of one batch of liquid coffee with the succeeding one.

According to the illustrated design there are two separate water circuits, as explained, thus insuring uniform and thorough heating of the water throughout the apparatus. All this is accomplished without any need on the part of the operator to raise buckets of hot water to the top of the apparatus nor is there any danger connected with the operation of the apparatus, for practically everything is accomplished merely by the proper manipulation of a few valves.

From the foregoing it will be evident that my apparatus as illustrated has three compartments or sections, one above the other, the upper for storage of hot water, the lower having a coffee reservoir and an enclosing water jacket and the middle compartment having a receptacle for the ground coffee together with a nozzle for spraying hot water onto it.

Having thus described my invention what I claim as new and desire to secure by Letters Patent is:

1. A coffee urn having a receptacle for the coffee grounds, a reservoir below it for the liquid coffee, a heating chamber above the receptacle, means for heating the water in the chamber, a spray nozzle above the receptacle and a duct leading from the heating chamber to the spray nozzle for spraying water upon the coffee grounds.

2. A coffee urn having a heating chamber for supplying hot water to the coffee grounds, an external water heater, and pipe connections forming a circuit leading from the external heater to the heating chamber and from the heating chamber back to the heater whereby the water in the heating chamber may be raised to and kept at a high temperature from a source of heat external to the body of the urn.

3. A coffee urn having a reservoir for the liquid coffee, a water jacket surrounding it, an external water heater, and connections whereby hot water may flow from the upper portion of the heater to the water jacket and from the water jacket to the lower portion of the heater.

4. A coffee urn having a reservoir for the liquid coffee, said reservoir being open at the top, a receptacle for the coffee grounds seating at the top of said reservoir, a nozzle for spraying hot water onto the coffee grounds, a heating chamber for water located above the spray, a pipe leading from said heating chamber to the spray nozzle for supplying hot water thereto, a water heater, and pipe connections between the water heater and the heating chamber forming a water circuit whereby the water in the heating chamber may be raised to and kept at high temperature.

5. A coffee urn having a reservoir for the liquid coffee, a water jacket surrounding it, a water heating chamber, a pipe leading from the water jacket to the chamber, a second pipe leading from the heating chamber to the water jacket, and means for heating the water in said heating chamber.

6. A coffee urn having a reservoir for the liquid coffee, a water jacket surrounding it, a water heating chamber, pipe connections leading from the heating chamber to the water jacket, and from the water jacket back to the heating chamber, and a water heater located in a parallel circuit, one end of said heater being connected to the heating chamber, and the other end to the water jacket.

7. A coffee urn having a reservoir for the liquid coffee, a water jacket surrounding it, a water heating chamber, a water heater, and pipe connections whereby the heater and the water jacket are arranged in parallel circuits to each other with respect to the water heating chamber.

8. A coffee urn having a reservoir for the liquid coffee, a water jacket therefor, a water heater, a pipe leading from the source of water supply to the heater, a branch from said pipe leading to the water jacket, a heating chamber, a pipe leading from the water jacket to the heating chamber, a pipe leading from the heating chamber to the water heater, a valve in the supply pipe and a valve in said branch.

9. A coffee urn having a reservoir for the liquid coffee, a water jacket therefor, a water heater, a pipe leading from the source of water supply to the heater, a branch from said pipe leading to the water jacket, a heating chamber, a pipe leading from the water jacket to the heating chamber, a pipe leading from the heating chamber to the water heater, a valve in the supply pipe, a valve in said branch, and an additional pipe leading from the heating chamber at the lower end of the water heater for affording an additional circuit for the water.

10. A coffee urn having three compartments, one above the other, the upper compartment for the storage of hot water, the lower compartment having a coffee reservoir, and the middle compartment having a receptacle for coffee grounds, the receptacle being removable and the urn having a door in the side through which the coffee receptacle may be withdrawn without interfering with the upper or lower compartments, there being also a spray nozzle in the middle compartment for spraying water onto the coffee grounds, and connections between the upper compartment and the spray nozzle.

11. A coffee urn having three compartments, one above the other, the upper compartment for storage of hot water, the lower compartment having a coffee reservoir and an enclosing water jacket, and the middle compartment having a receptacle for coffee grounds, a spray nozzle and connections for leading water from the upper compartment to the spray nozzle for spraying the coffee, a heater for the water, and pipe connections leading from the heater to the upper compartment and from the upper compartment to the water jacket, and from the water jacket back to the heater.

12. A coffee urn having three compartments, one above the other, the upper compartment for storage of hot water, the lower compartment having a coffee reservoir and an enclosing water jacket, and the middle compartment having a receptacle for coffee grounds, a spray nozzle and connections for leading water from the upper compartment to the spray nozzle for spraying the coffee, a heater for the water, and pipe connections leading from the heater to the upper compartment and from the upper compartment to the water jacket, and from the water jacket back to the heater, and an independent duct leading from the upper compartment directly back to the heater for providing an additional water circuit.

13. A coffee urn having a liquid coffee reservoir, a water jacket therefor, a heating chamber in which a fresh charge of water may be stored for heating purposes while the liquid coffee is being dispensed, the heating chamber being connected to the water jacket, a heater connected at its opposite ends to the heating chamber to thereby form a heating circuit, a cold water supply pipe connected to the heater and to the water jacket, and a valve for disconnecting the cold water supply from the jacket whereby at times cold water may flow directly to the heater and to the water jacket and at other times the water jacket will be disconnected, thereby enabling it to retain its heat while the heater is bringing a fresh charge of water up to the desired temperature with the aid of said heating circuit.

14. A coffee urn having a liquid coffee reservoir, a water jacket therefor, a heating chamber, a heater, and two independent water circuits arranged in parallel and including the heater as a duct common to both circuits, one of the circuits including the heating chamber and the water jacket.

15. A coffee urn having a liquid coffee reservoir, a water jacket therefor, a heating chamber, a heater, two independent water circuits arranged in parallel and including the heater as a duct common to both circuits, one of the circuits including the heating chamber and the water jacket, and means for supplying cold water at will to the heater and to the water jacket, independently of each other.

In witness whereof, I have hereunto subscribed my name.

LOUIS K. SCHWALL.